United States Patent

[11] 3,610,540

[72] Inventors Otto C. Krolopp
Villa Park, Ill.;
Leon J. Nowak, Liverpool, N.Y.
[21] Appl. No. 822,229
[22] Filed May 6, 1969
[45] Patented Oct. 5, 1971
[73] Assignee Blaw-Knox Company
Pittsburgh, Pa.

[54] METHOD AND APPARATUS FOR TREATING GRANULIZED COFFEE
19 Claims, 3 Drawing Figs.
[52] U.S. Cl. .................................................. 241/2,
241/13, 241/29, 241/152 R, 241/188 R, 241/284,
259/8, 259/44
[51] Int. Cl. ...................................................... B02c 3/04,
B02c 4/02, B02c 13/24
[50] Field of Search ........................................... 241/6–13,
26, 27, 63, 188, 284; 259/8, 43, 44, 134, 135

[56] References Cited
UNITED STATES PATENTS
2,202,936 6/1940 Williams ...................... 241/284 X
3,329,350 7/1967 Wisgerhof ................... 241/188 X Primary Examiner—Donald G. Kelly
Attorney—Parker, Carter & Markey ABSTRACT: The method and apparatus for treating granulized coffee delivered from a granulizing mill. The coffee from the mill is conveyed into the lower portion of an upright mixing chamber having a rotating agitator with mixing blades inclined at an angle to move the material upwardly while mixing. The pressure head of the material in the chamber is controlled to achieve improved mixing conditions. The blades in a flight at the chamber discharge end have a reverse pitch for restricting flow through the chamber, and the discharged material is delivered to a scalper for subsequent treatment.

INVENTORS.
OTTO C. KROLOPP
LEON J. NOWAK, JR.
BY Parker, Carter & Markey
Attorneys.

METHOD AND APPARATUS FOR TREATING GRANULIZED COFFEE

SUMMARY OF THE INVENTION

This invention relates to an improved method and apparatus for treating granulized coffee. More particularly the invention relates to a method and apparatus for mixing and agitating coffee from a granulizer to achieve increased output capacity and machine efficiency while at the same time obtaining an improved product.

Coffee beans are conventionally prepared for consumer use by roasting, granulizing in a mill, mixing the granulized particles to the density and appearance desired, treatment in a scalper mechanism to separate oversized material, and delivery to the packaging operation. The patents to Hazle, Jr., U.S. Pat. No. 2,118,010, —2,204,591 and 2,323,771 disclose apparatus in which the granulizing mill delivers the coffee to a horizontal tub-type mixer. The granulized coffee is agitated in the mixer to hide or camouflage the light-colored chaff by absorbing small amounts of oil from the coffee. Otherwise the light-colored chaff would give the coffee product an undesirable appearance.

The industry has been seeking to increase the capacity and efficiency of the granulizer-mixer equipment while maintaining the desirable standards of appearance and quality for the coffee product. Merely increasing the size and speed of the equipment is not entirely satisfactory as it is necessary to carefully control the amount of oil release from the coffee, the amount of comminution of chaff, and the compactability or bulk density of the coffee produce. It is also desirable that the amount of temperature rise during the granulizing-mixing steps be kept at a low level to control oil release and reduce the time required for cooling before the coffee can be packaged.

Accordingly, it is an object of this invention to provide an improved method and apparatus for treating coffee in which granulized coffee is delivered to a mixing chamber where pressure a pressure head is maintained on the material as it is agitated and moved upwardly through the chamber for discharge.

Another object is to provide an improved method and apparatus for treating coffee in which granulized coffee is delivered into the lower end of an upstanding mixer chamber having rotating mixing blades adapted to move the coffee upwardly to the discharge end, and with means to maintain a predetermined head on the material in the chamber to achieve optimum comminution and oil absorption in the chaff, reduce the temperature rise during mixing, reduce the quantity of fines in the coffee, and increase the bulk density for an improved coffee product. Another object is to provide an improved mixer for use in a coffee treating apparatus in which granulized coffee is moved upwardly to a mixing chamber by rotating blades which agitate the coffee particles, break down the chaff and color it by absorption of oil released from the coffee particles under pressure in the mixer, and in which rotating blades near the mixer discharge function to supplement the pressure head on the particles.

Another object is to provide a mixer apparatus for granulized coffee in which an upstanding mixing chamber and rotating agitator develop an improved mixing action and transformation of the coffee chaff by developing a gravity head on the coffee during mixing, and by controlling the rate of discharge from the chamber as a function of the coffee input rate and additional head desired.

Another object is to provide the method and apparatus for treating coffee by granulizing coffee beans, conveying the granulized coffee by auger means to the lower portion of a substantially vertical mixing chamber, moving the coffee upwardly through the chamber at a controlled rate to maintain a predetermined gravity head, mixing the coffee in the chamber to comminute chaff and absorb oil from the coffee into the chaff, and control the rate of discharge from the upper portion of the chamber as a function of the total head on the coffee desired for optimum mixing.

Another object is to provide the method and apparatus for mixing granulized coffee in an upward flow path productive of increased capacity with relatively low power requirements.

These and other objects and advantages of the invention will become apparent to those skilled in the art when the following specification is read in conjunction with the accompanying drawings.

DETAILED DESCRIPTION

Figure 1:
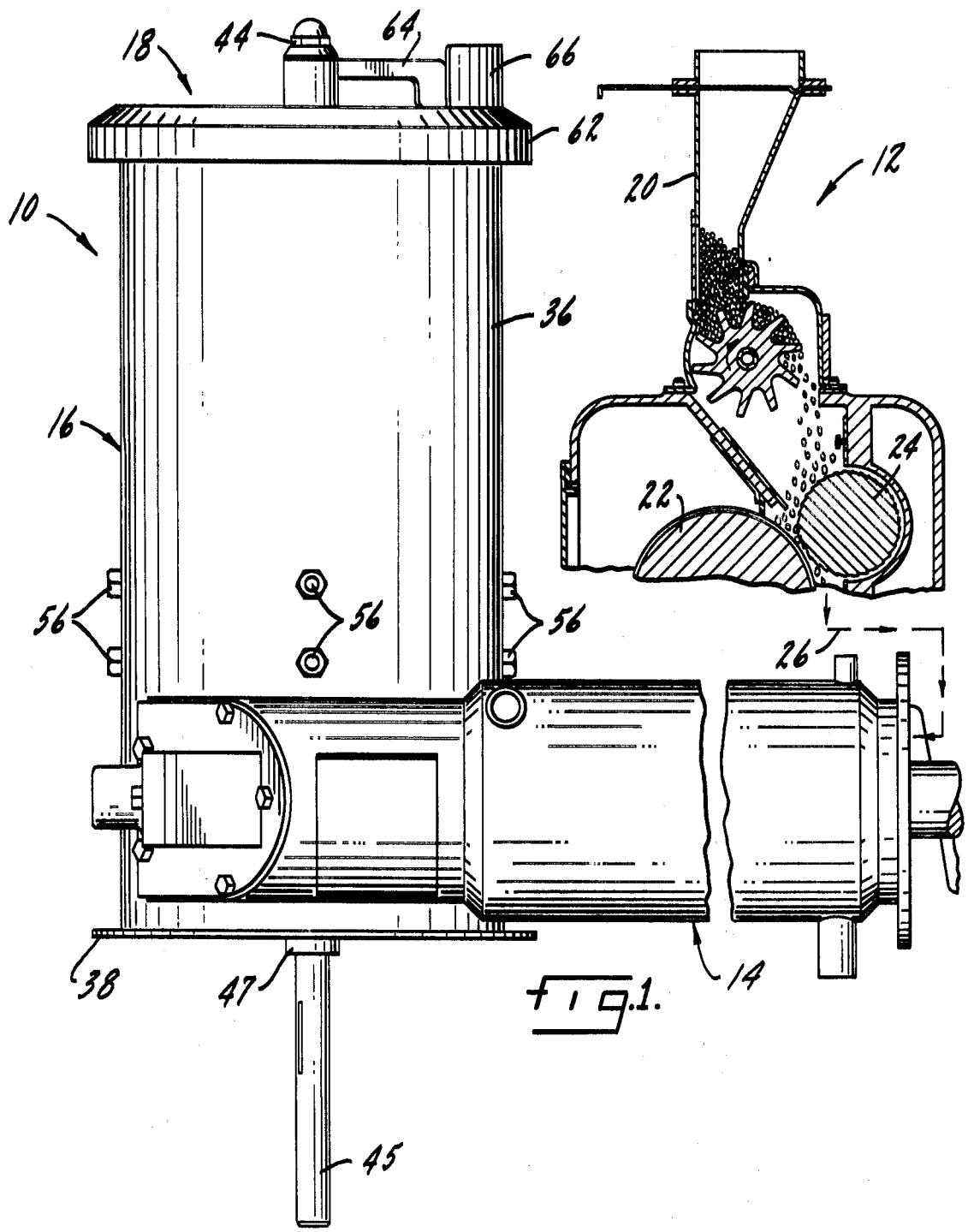
FIG. 1 is a side elevation view, partially sectioned with certain elements removed for clarity, illustrating an apparatus for treating coffee according to the invention.

Referring to the drawings and particularly FIG. 1 a coffee-treating apparatus embodying features of the invention is illustrated generally at 10 and comprises a granulizer 12, screw conveyor 14, and mixer assembly 16 which discharges at outlet 18.

Granulizer 12 functions to comminute or reduce roasted coffee beans which are delivered from supply hopper 20 and fed at a controlled rate onto a plurality of granulizing rolls 22, 24. The granulizer may be of the type disclosed in copending application Ser. No. 579,634, filed Sept. 15, 1966 by Otto C. Kr olopp, now U.S. Pat. No. 3,491,952 issued Jan. 27, 1970.

The lower portion of granulizer 12 and the subsequent granulizing rolls are not shown for clarity, and the path of material flow is indicated at 26 for delivery to the input end of conveyor 14.

Conveyor 14 receives the granulized coffee from the granulizer mill and axially moves it to the lower end of mixer 16 by suitable means such as the auger or screw 28 mounted within housing 30 and powered by a suitable motor, not shown. A cooling jacket 32 may be provided around the conveyor housing for circulation of a cooling medium such as water to cool the granulized material.

Conveyor 14 discharges into mixer 16 preferably by side delivery to an opening 34 provided at the lower end of mixer chamber or shell 36. The exact location for the point of delivery to the mixer chamber could be elsewhere, such as at chamber bottom wall 38, but should be positioned to feed the mixer from its lower portion for upward movement. It has been found that this provides a gravity head on the material in the mixing chamber for optimum mixing characteristics, as explained hereinafter.

Mixer chamber 36 preferably has a cylindrical configuration for rotatably mounting rotor assembly 40. Rotor assembly 40 comprises a plurality of radially extending members, here paddles or blades 42 mounted by suitable means, such as by keyed hub 43, on shaft 44 for rotation about a substantially vertical axis within the chamber. The rotor assembly may be driven in coordination with conveyor 14 by suitable means such as an electric motor and drive arrangement, not shown, connected with shaft extension 45 depending downwardly through a bearing support 47 in bottom wall 38.

Figure 2:
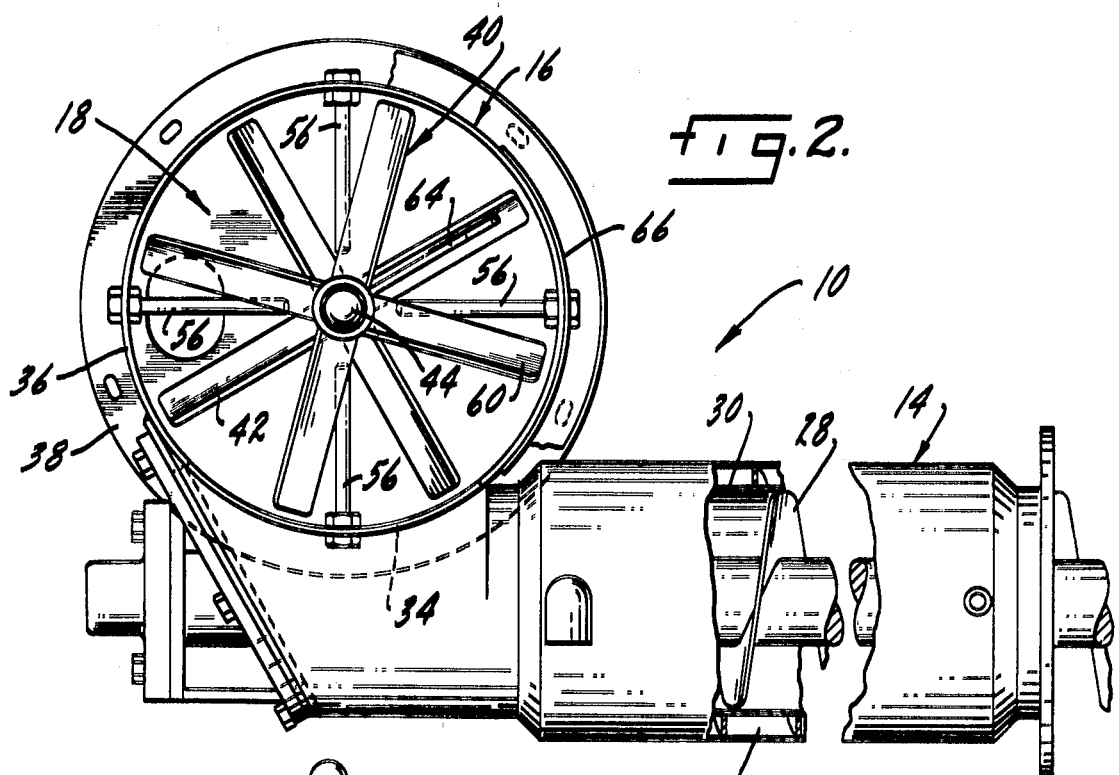
FIG. 2 is a top plan view of the apparatus of FIG. 1 with elements removed for clarity.
Figure 3:
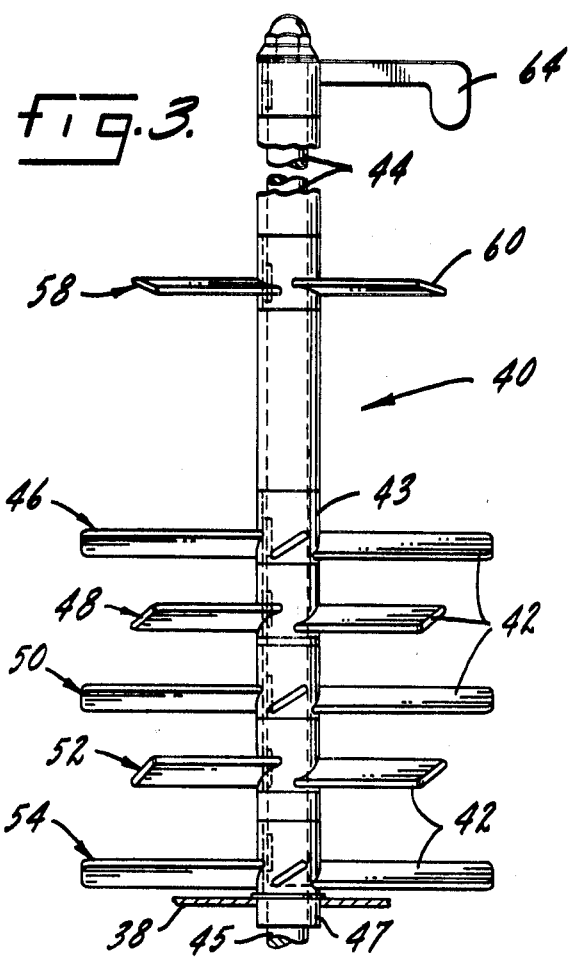
FIG. 3 is a side elevation view of a mixer rotor for the coffee-treating apparatus of the invention.

The mixer blades 42 are arranged axially along shaft 44 in a series of flights with four blades in each flight secured to the shaft hub and with 90° spacing, as viewed axially, between blades. Five spaced-apart flights 46, 48, 50, 52, 54 are illustrated as preferred, although it is understood that the number of flights required for mixing and the number of blades in each flight can be varied as required by the particular design configuration and flow capacity desired. As illustrated in FIG. 2 alternate flights are preferably aligned with their blades at staggered angles when viewed axially to achieve uniform mixing, although this blade positioning could be varied without departing from the invention.

A plurality of radially and inwardly extending stationary agitating fingers or pins 56 are secured to the walls of chamber 36 at axial positions between the blade flights. Fingers 56 are shown as rod shaped, although they could be flat, and they function to provide resistance to rotation and increase the agitation as the blades rotate. Otherwise the material would tend to merely rotate with the blades without satisfactory chaff comminution and color hiding qualities. Although four fingers 56 are shown as positioned on either side of flight 46 at equally spaced locations about shaft 44, the exact number and location thereof could be varied as required.

The blades 42 in each flight are axially inclined so that as shaft 44 rotates the blades will both mix and elevate the coffee. In the embodiment illustrated the blades are inclined to function in this manner for clockwise rotation of shaft 44, when viewed from above, although this would be reversed for counterclockwise rotation. The inclination of the blades may be varied, as from 15°–35°, for example, depending upon the design configuration of a particular application. The individual blades may be flat, as shown, although they may be curved or twisted to effect the mixing action.

A flight of flow restricting blades 58 is mounted on shaft 44 at a position axially spaced above mixing flights 46–54. The blades 60, shown as four, of flight 58 have a reverse inclination to that of mixer blades 42 so that the upward flow of material within chamber 36 is restricted somewhat. The angle of inclination may be within the range of 5°–20°. This restriction provides an additional pressure head on the material being mixed and yet allows the material to flow into discharge end 18 at a predetermined rate. Although one flight of restricter blades is shown as preferred, a plurality of flights could be provided depending upon the desired head of a particular mixer construction, The blades may be flat, as shown, curved or twisted as desired.

Applicants have found that control of the amount of head maintained on the material in the mixer chamber as a function of input flow rate, rotor speed, and amount of outlet restriction gives a consequent control over chaff comminution, oil release from the coffee, and quality of the coffee product. Excessive head will create highly undesirable fines in the end product since coffee will be comminuted along with the chaff. An insufficient head will cause inadequate comminution of chaff and an undesirable, light-colored chaff flake will be visible in the end product. Also, the mixing action will knock the corners off the large coffee particles and compact the small particles into coherent masses for improved bulk density.

The head in the the mixer may be additionally controlled by regulating the rate of material flow or spill from the output end of mixer chamber 36, such as with an adjustable spill at the outlet, not shown, to regulate the height of the material maintained within the chamber.

Control of the head also results in less temperature rise in the product during mixing. One embodiment of the invention showed that the temperature rise was from 5°–10° F. lower as compared to conventional equipment. The result is that there is less release of coffee oils which would otherwise detrimentally affect the finished product, both in taste and in handling qualities. Also with the present equipment the coffee must be held for a period of time before packaging to reduce the possibility of exploding coffee cans due to heat-generated gases. The present invention reduces this holding time considerably.

In operation, with the combined action of the screw conveyor adding coffee at the bottom and the rotation of rotor 40 an upward thrust on the mass in the chamber is maintained with the top flight tending to resist upward movement. The coffee particles will spill over the top of mixer baffle 62 for subsequent treatment, preferably into a scalper device or vibrating screen, not shown, which could be mounted at the upper or discharge end of mixer 16. An upper skimming arm 64 mounted for rotation with rotor shaft 44 may be employed to brush or distribute the coffee laterally onto the scalper screen surrounding baffle 62 and spread out the oversize particles. An upstanding skirt or shield 66 is secured to the mixer baffle may be employed to deflect particles away from an oversize discharge spout, not shown, in the scalper. The fines and normal particles which would go through the screen may be delivered by suitable means to the point of use for further handling and packaging.

What is claimed is:

1. For use with a coffee-treating apparatus having a granulizer for reducing coffee beans, and means to convey the granulized coffee material from the granulizer, the combination including: an upstanding mixer chamber in material receiving communication at its lower end with the conveyor; a mixer rotor mounted for rotation about a substantially vertical axis within the chamber; a plurality of mixer blades mounted for rotation with the rotor for agitating and blending the coffee received from the conveyor during upward movement thereof within the chamber; and, means at the upper end of chamber to restrict upward flow of the coffee for developing a pressure head within the chamber.

2. The invention of claim 1 wherein the mixer blades comprise a plurality of blade flights axially spaced along the rotor, each blade flight having a plurality of blades adapted to mix the coffee and urge it upwardly within the chamber.

3. The invention of claim 2 wherein a plurality of blades are inclined axially in a direction to urge the coffee upwardly upon rotation of the rotor.

4. The invention of claim 1 and further including a plurality of agitator fingers mounted on the mixer chamber and extending radially into the path of material flow adjacent the mixer blades.

5. The invention of claim 1 wherein the means to restrict the coffee flow comprises at least one flight of flow restrictor blades mounted for rotation with the rotor at the discharge end of the chamber.

6. The invention of claim 5 wherein a plurality of the restrictor blades have an axial inclination effective to limit discharge of the coffee during rotation of the rotor to supplement said pressure head.

7. The invention of claim 6 wherein the mixer blades have an axial inclination reversed from the axial inclination of the restrictor blades.

8. A coffee mixer for use in treating granulized coffee comprising the combination of: an upstanding chamber; a plurality of mixer members mounted for rotation about a substantially vertical axis within the chamber and adapted to receive granulized coffee at the lower end of the chamber for agitating and mixing the coffee during upward movement thereof to the upper discharge end of the chamber; said mixer members being in contact with coffee within the mixing chamber over the entire area of movement of said mixer arms, and, means at the chamber discharge end to restrict flow therefrom and develop a pressure head on the coffee being mixed within the chamber.

9. A coffee mixer for use in treating granulized coffee comprising the combination of: an upstanding chamber; a plurality of mixer blades mounted for rotation about a substantially vertical axis within the chamber and adapted to receive granulized coffee at the lower end of the chamber for agitating and mixing the coffee during upward movement thereof to the upper discharge end of the chamber; and means at the chamber discharge end to restrict flow therefrom and develop a pressure head on the coffee being mixed within the chamber, said means for restricting the flow comprising a plurality of restrictor blades mounted for rotation about a substantially vertical axis at the chamber discharge end, the restrictor blades having an axial inclination tending to urge the coffee downwardly during blade rotation.

10. The invention of claim 9 wherein the mixer blades comprise a plurality of blade flights axially spaced within the chamber, the blade flights having a plurality of blades with an inclination effective to tend to move the coffee upwardly within the chamber during mixer blade rotation, and a plurality of agitator fingers mounted on the chamber and extending radially into the chamber adjacent the mixer flights.

11. The invention of claim 10 and further including a rotor mounted for rotation about said axis, and characterized in that the mixer blades and restrictor blades are mounted for rotation with the rotor, the mixer and restrictor blades having oppositely inclined angles to develop said head within the chamber during rotation of the rotor.

12. The method of treating coffee including the steps of: granulizing coffee beans; conveying the granulized coffee to the lower end of a mixing chamber, moving the coffee upwardly within the chamber under a pressure head; mixing the coffee within the chamber to comminute chaff and release oil from the coffee for absorption into the chaff; restricting the rate of coffee flow from the chamber discharge end; and, discharging the coffee from the chamber for subsequent treatment.

13. The method of claim 12 wherein the step of conveying the coffee to the chamber includes moving the coffee with a screw conveyor to force the coffee into the chamber under pressure, and the step of mixing the coffee comprises rotating a plurality of mixer blades about an upstanding axis within the chamber.

14. The method of claim 13 wherein the step of restricting the flow from the chamber comprises rotating a plurality of blades at the discharge end about an upstanding axis with the blades having an axial inclination effective to tend to urge the material downwardly.

15. The method of mixing granulized coffee in a mixing chamber comprising the steps of: forcing granulized coffee from a coffee conveyor means into the lower portion of a generally vertically axised chamber; moving the coffee upwardly within the chamber under a pressure head existing within the entire body of coffee whose periphery is defined by the paths of movement of mixer members, while agitating the coffee with said mixer members; and restricting discharge of the coffee from the chamber at a location above the mixer members.

16. The method of claim 15 wherein the step of mixing includes moving a plurality of mixer members about an upright axis within the chamber, the members having an orientation effective to urge the coffee upwardly and agitate the coffee while comminuting the chaff.

17. The method of claim 16 wherein the mixer members are moved about said axis in a plurality of axially spaced flights, and the members are moved between a plurality of agitator fingers on the chamber radially extending adjacent the flights.

18. The method of mixing granulized coffee in a mixing chamber comprising the steps of: forcing granulized coffee from a coffee conveyor means into the lower portion of the chamber; moving the coffee upwardly within the chamber under a pressure head while agitating the coffee with mixer blades; and, restricting discharge of the coffee from the chamber at a location above the mixer blades by moving a plurality of restrictor blades about an upright axis at a location within the chamber above the mixer blades, the restrictor blades having an axial inclination effective to urge the coffee downwardly during restrictor blade rotation.

19. The method of mixing granulized coffee in a mixing chamber comprising the steps of: forcing granulized coffee from a coffee conveyor means into the lower portion of the chamber; moving the coffee upwardly within the chamber under a pressure head while agitating the coffee with mixer blades; and, restricting discharge of the coffee from the chamber at a location above the mixer blades, said steps of mixing and restricting the coffee discharge being effected by simultaneously rotating a plurality of mixer blades and restrictor blades about an upright rotor within the chamber, the restrictor blades being positioned on the rotor above the mixer blades, the mixer blades having an axial inclination effective to urge the coffee upwardly, and the restrictor blades effective to urge the coffee downwardly to establish a pressure head within the chamber while discharging the coffee.